(12) United States Patent
Krafft et al.

(10) Patent No.: US 10,038,493 B2
(45) Date of Patent: Jul. 31, 2018

(54) INTERNET PROTOCOL LOW NOISE BLOCK FRONT END ARCHITECTURE

(75) Inventors: Stephen Edward Krafft, Santa Cruz, CA (US); Ramon A. Gomez, San Juan Capistrano, CA (US); Rajesh S. Mamidwar, San Diego, CA (US)

(73) Assignee: AVAGO TECHNOLOGIES GENERAL IP (SINGAPORE) PTE. LTD, Singapore (SG)

( * ) Notice: Subject to any disclaimer, the term of this patent is extended or adjusted under 35 U.S.C. 154(b) by 55 days.

(21) Appl. No.: 13/330,800

(22) Filed: Dec. 20, 2011

(65) Prior Publication Data
US 2012/0163290 A1 Jun. 28, 2012

Related U.S. Application Data

(60) Provisional application No. 61/427,534, filed on Dec. 28, 2010.

(51) Int. Cl.
*H04B 7/185* (2006.01)
*H04W 4/18* (2009.01)
(Continued)

(52) U.S. Cl.
CPC .......... *H04B 7/18582* (2013.01); *H04W 4/18* (2013.01); *H04W 4/80* (2018.02); *H04W 28/04* (2013.01); *H04W 84/06* (2013.01)

(58) Field of Classification Search
CPC ....... H04W 84/06; H04W 4/008; H04W 4/18; H04W 28/048; H04W 4/80; H04W 28/04; H04H 40/90; H04H 2201/14; H04H 20/74; H04H 60/33; H04B 7/18582; H04B 7/18578; H04B 7/18523; H04B 7/18595; H04B 1/0057; H04B 1/006; H04L 12/2801; H04L 69/08; H04L 12/64; H04L 29/06027; H04L 65/4076; H04L 12/66; H04L 12/189; H04L 65/60; H04N 21/4622; H04N 21/6143; H04N 21/236; H04N 21/40; H04N 21/43; H04N 7/20; H04N 21/43615
(Continued)

(56) References Cited

U.S. PATENT DOCUMENTS 5,659,615 A * 8/1997 Dillon ................. H04B 7/1858
340/5.74
6,236,833 B1 * 5/2001 Peyrovian .................... 455/12.1
(Continued)

FOREIGN PATENT DOCUMENTS

WO WO/2010/054543 * 5/2010

OTHER PUBLICATIONS

Guo et al., "Method, Device and System for Channel Switching", May 20, 2010, WIPO, WO/2010/054543, machine translation.*

*Primary Examiner* — Paul H Masur
*Assistant Examiner* — Michael K Phillips
(74) *Attorney, Agent, or Firm* — Garlick & Markison; Harry S. Tyson, Jr.

(57) ABSTRACT

Provided is a packet network adapter operable to receive a satellite intermediate frequency (IF) signal and determine whether the satellite IF signal includes DVB content based upon a network client request. When the satellite IF signal includes the requested DVB content, the satellite network adapter produces packetized data for delivery of the digital content to a network client or clients based upon the network client request.

20 Claims, 13 Drawing Sheets

(51) Int. Cl.
*H04W 4/80* (2018.01)
*H04W 84/06* (2009.01)
*H04W 28/04* (2009.01)

(58) Field of Classification Search
USPC ....... 370/316, 401, 466, 338, 315; 455/3.02; 725/68, 69, 67, 70, 71
See application file for complete search history.

(56) References Cited

U.S. PATENT DOCUMENTS

| | | | | |
|---|---|---|---|---|
| 6,477,179 | B1* | 11/2002 | Fujii et al. | 370/466 |
| 6,889,385 | B1* | 5/2005 | Rakib | G08B 13/19656 348/E7.069 |
| 6,963,590 | B1* | 11/2005 | Mann et al. | 370/535 |
| 7,039,048 | B1* | 5/2006 | Monta | H04L 12/2801 370/389 |
| 7,089,577 | B1* | 8/2006 | Rakib et al. | 725/87 |
| 7,343,140 | B2* | 3/2008 | Hanrahan | H03D 7/16 348/E5.097 |
| 7,369,520 | B2* | 5/2008 | Luoma et al. | 370/312 |
| 7,477,871 | B1* | 1/2009 | Gurantz et al. | 455/3.01 |
| 2001/0025377 | A1* | 9/2001 | Hinderks | 725/109 |
| 2002/0031120 | A1* | 3/2002 | Rakib | G08B 13/19656 370/386 |
| 2002/0059637 | A1* | 5/2002 | Rakib | G08B 13/19656 725/119 |
| 2002/0147645 | A1* | 10/2002 | Alao et al. | 705/14 |
| 2003/0203718 | A1* | 10/2003 | Wiswell | 455/13.3 |
| 2004/0172658 | A1* | 9/2004 | Rakib et al. | 725/120 |
| 2005/0226237 | A1* | 10/2005 | Chapel | H04L 12/2805 370/389 |
| 2005/0289623 | A1* | 12/2005 | Midani et al. | 725/100 |
| 2006/0050736 | A1* | 3/2006 | Segel | 370/474 |
| 2006/0062200 | A1* | 3/2006 | Wang | H04L 12/1836 370/352 |
| 2006/0104305 | A1* | 5/2006 | Yoshida | H04L 29/06027 370/466 |
| 2006/0225102 | A1* | 10/2006 | James et al. | 725/68 |
| 2006/0235993 | A1* | 10/2006 | Gervais et al. | 709/238 |
| 2007/0074260 | A1* | 3/2007 | Elstermann | 725/117 |
| 2007/0168655 | A1* | 7/2007 | Thomasson | H04L 63/0428 713/151 |
| 2008/0064323 | A1* | 3/2008 | Barda | H04B 7/18528 455/3.01 |
| 2008/0109854 | A1* | 5/2008 | Casavant et al. | 725/68 |
| 2008/0120667 | A1* | 5/2008 | Zaltsman | H04L 12/2856 725/110 |
| 2008/0127277 | A1* | 5/2008 | Kuschak | H04H 60/80 725/74 |
| 2009/0070823 | A1* | 3/2009 | Barroso | H04H 20/74 725/67 |
| 2009/0102706 | A1* | 4/2009 | Goldblatt et al. | 342/352 |
| 2009/0165067 | A1* | 6/2009 | Bruckman et al. | 725/110 |
| 2009/0232077 | A1* | 9/2009 | Krieger et al. | 370/329 |
| 2010/0027411 | A1* | 2/2010 | Weber | H04H 40/90 370/216 |
| 2010/0027613 | A1* | 2/2010 | Zimmerman et al. | 375/240.01 |
| 2010/0195503 | A1* | 8/2010 | Raleigh | 370/235 |
| 2010/0304702 | A1* | 12/2010 | Anzures et al. | 455/313 |
| 2010/0325670 | A1* | 12/2010 | Strong et al. | 725/71 |
| 2011/0035647 | A1* | 2/2011 | Eidson et al. | 714/780 |
| 2011/0035772 | A1* | 2/2011 | Ramsdell et al. | 725/36 |
| 2011/0050491 | A1* | 3/2011 | Foerster | G01S 19/23 342/357.25 |
| 2011/0081129 | A1* | 4/2011 | Quan | 386/252 |
| 2011/0103374 | A1* | 5/2011 | Lajoie et al. | 370/352 |
| 2011/0138064 | A1* | 6/2011 | Rieger et al. | 709/228 |
| 2012/0093072 | A1* | 4/2012 | Ragland | H04B 7/18578 370/316 |

\* cited by examiner

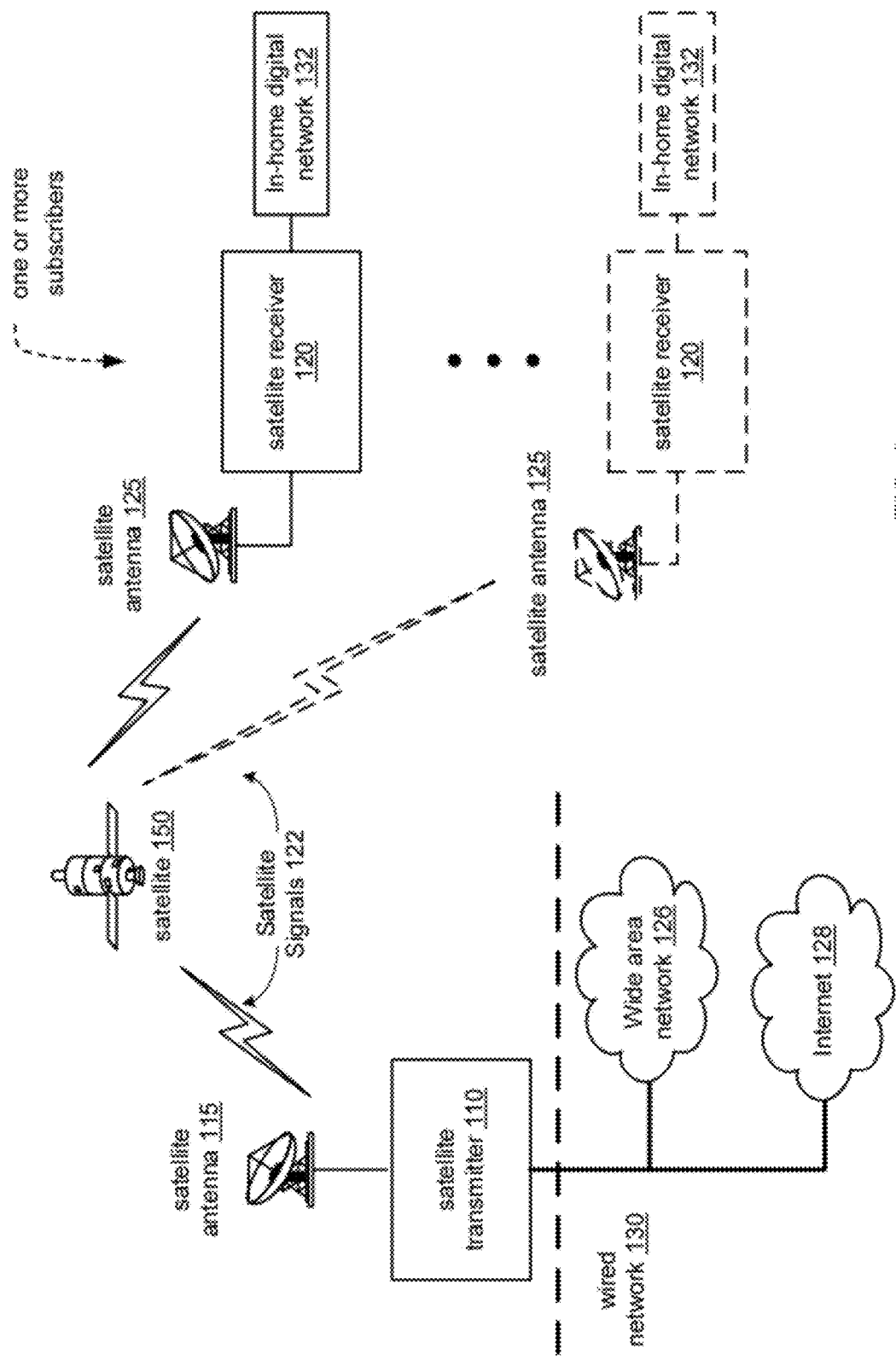

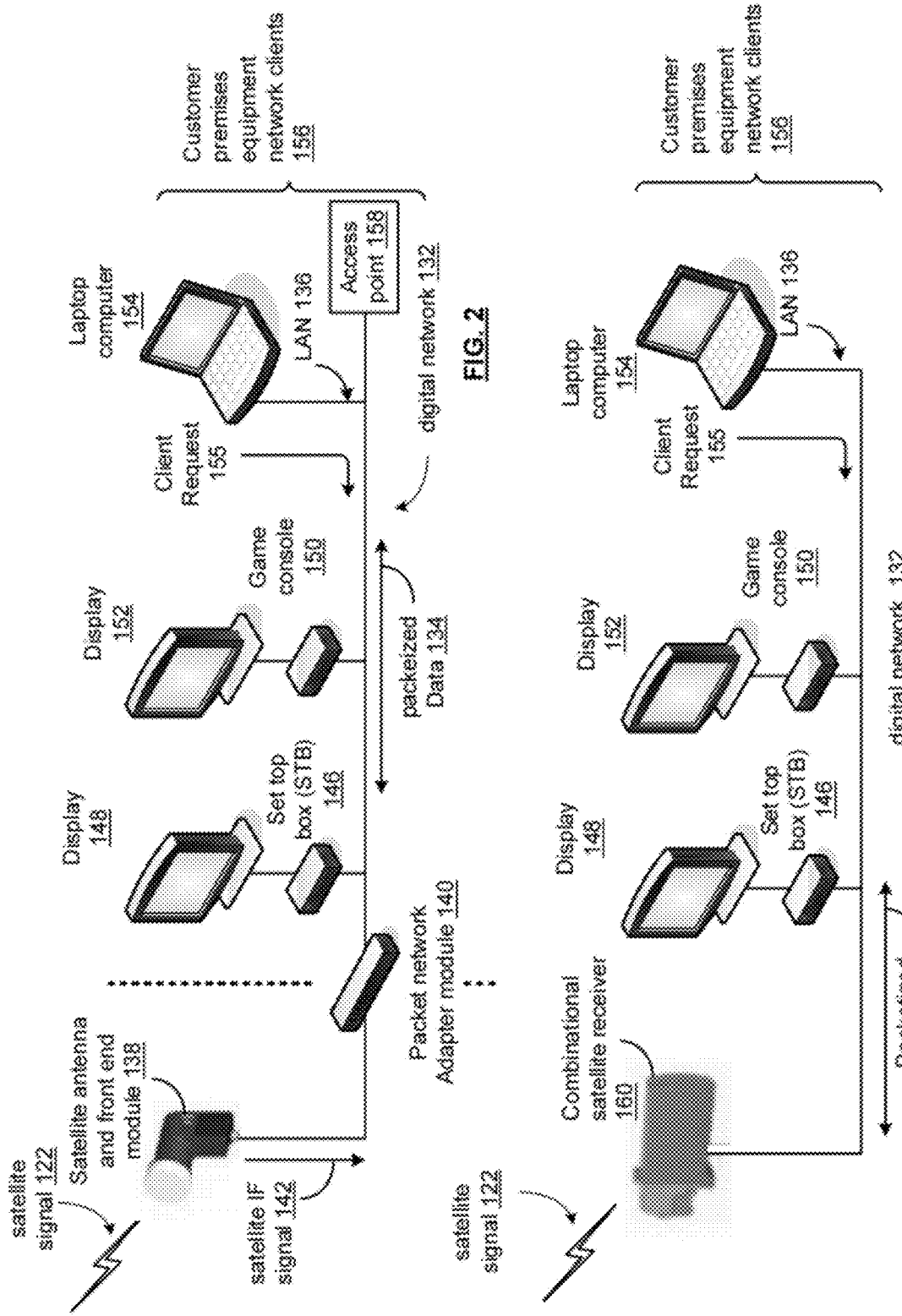

packet network adapter module 140

Satellite Front End Module 157

Channelizer module 348

US 10,038,493 B2

INTERNET PROTOCOL LOW NOISE BLOCK FRONT END ARCHITECTURE

The present U.S. Utility Patent Application claims priority pursuant to 35 U.S.C. § 119(e) to the following U.S. Provisional Patent Application which is hereby incorporated herein by reference in its entirety and made part of the present U.S. Utility Patent Application for all purposes:
1. U.S. Provisional Application Ser. No. 61/427,534, entitled "INTERNET PROTOCOL LOW NOISE BLOCK FRONT END ARCHITECTURE", filed Dec. 28, 2010.

BACKGROUND

1. Technical Field

The present invention relates generally to Internet Protocol (IP) based communications; and more particularly to providing IP based communications from a satellite communication system itself, or by a satellite communication system in cooperation with other communication system(s).

2. Related Art

Communication systems are known to support wireless and wire lined communications between wireless and/or wire lined communication devices. Such communication systems range from national and/or international cellular telephone systems to the Internet to point-to-point wireless networks. Each type of communication system is constructed, and hence operates, in accordance with one or more communication standards. For instance, wireless communication systems may operate in accordance with one or more standards including, but not limited to, IEEE 802.11x, Bluetooth, wireless wide area networks (e.g., WiMAX), advanced mobile phone services (AMPS), digital AMPS, global system for mobile communications (GSM), North American code division multiple access (CDMA), Wideband CDMA, local multi-point distribution systems (LMDS), multi-channel-multi-point distribution systems (MMDS), radio frequency identification (RFID), Enhanced Data rates for GSM Evolution (EDGE), General Packet Radio Service (GPRS), and many others.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for a wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (that is, receiver and transmitter) or is coupled to an associated radio transceiver (for example, a station for wireless communication networks, RF modem, et cetera). The receiver is coupled to an antenna and includes a low noise amplifier (LNA), one or more intermediate frequency (IF) stages, a filtering stage, and a data recovery stage. The low noise amplifier receives inbound RF signals via the antenna and amplifies them. The one or more intermediate frequency stages mix the amplified RF signals with one or more local oscillations to convert the amplified RF signal into baseband signals or intermediate frequency signals. The filtering stage filters the baseband signals or the IF signals to attenuate unwanted out-of-band signals to produce filtered signals. The data recovery stage recovers raw data from the filtered signals in accordance with the particular wireless communication standard.

The transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Many wireless transceivers are able to support multiple communication standards, which may be in the same frequency band or in different frequency bands. For example, a wireless transceiver may support Bluetooth communications for a personal area network and IEEE 802.11 communications for a Wireless Local Area Network (WLAN). In this example, the IEEE 802.11 communications and the Bluetooth communications may be within the same frequency band (for example, 2.4 GHz for IEEE 802.11b, g, etc.). Alternatively, the IEEE 802.11 communications may be in a different frequency band (for example, 5 GHz) than the Bluetooth communications (for example, 2.4 GHz). For Bluetooth communications and IEEE 802.11b, 802.11g, et cetera, communications are interactive protocols that appear to the user as simultaneous implementation, but is actually a shared serial implementation. As such, while a wireless transceiver supports multiple types of standardized communications, it can only support one type of standardized communication at a time.

A transceiver that supports multiple standards includes multiple RF front-ends (for example, on the receiver side, separate LNA, channel filter, and IF stages for each standard and, on the transmitter side, separate IF stages, power amplifiers, and channels filters for each standard). As such, multiple standard transceivers include multiple separate RF front-ends; one for each standard in a different frequency band, channel utilization scheme (e.g., time division multiple access, frequency division multiple access, code division multiple access, orthogonal frequency division multiplexing, et cetera), and/or data modulation scheme (for example, phase shift keying, frequency shift keying, amplitude shift keying, combinations and/or variations thereof). Such multiple transceivers are fixed in that they can typically support standards to which they were designed. The transceiver may also include separate baseband processing modules for each communication standard supported. Thus, as a new standard is released, new hardware may be needed for a wireless communication device to support the newly released standard.

Satellite communication systems are often used to service Internet access as well as servicing multimedia content broadcasts. These systems, as well as other systems, are bandwidth limited and cannot always meet customer demand for high-throughput multimedia content for distribution to an Internet Protocol (IP) based communication network.

BRIEF DESCRIPTION OF THE DRAWINGS

FIG. 1 is a diagram illustrating a satellite communication system according to an embodiment of the invention;

FIG. 2 is a system diagram illustrating a local area network (LAN) based digital network 132 that receives digital multimedia content by a satellite communication system via a satellite Internet Protocol (IP) adapter in accordance with an embodiment of the present invention;

FIG. 3 is a system diagram illustrating a digital network that receives satellite multimedia content as an IP-based single program transport stream via a combinational satellite receiver that includes a packet network adapter in accordance with an embodiment of the present invention;

DETAILED DESCRIPTION OF THE DRAWINGS

Figure 4:
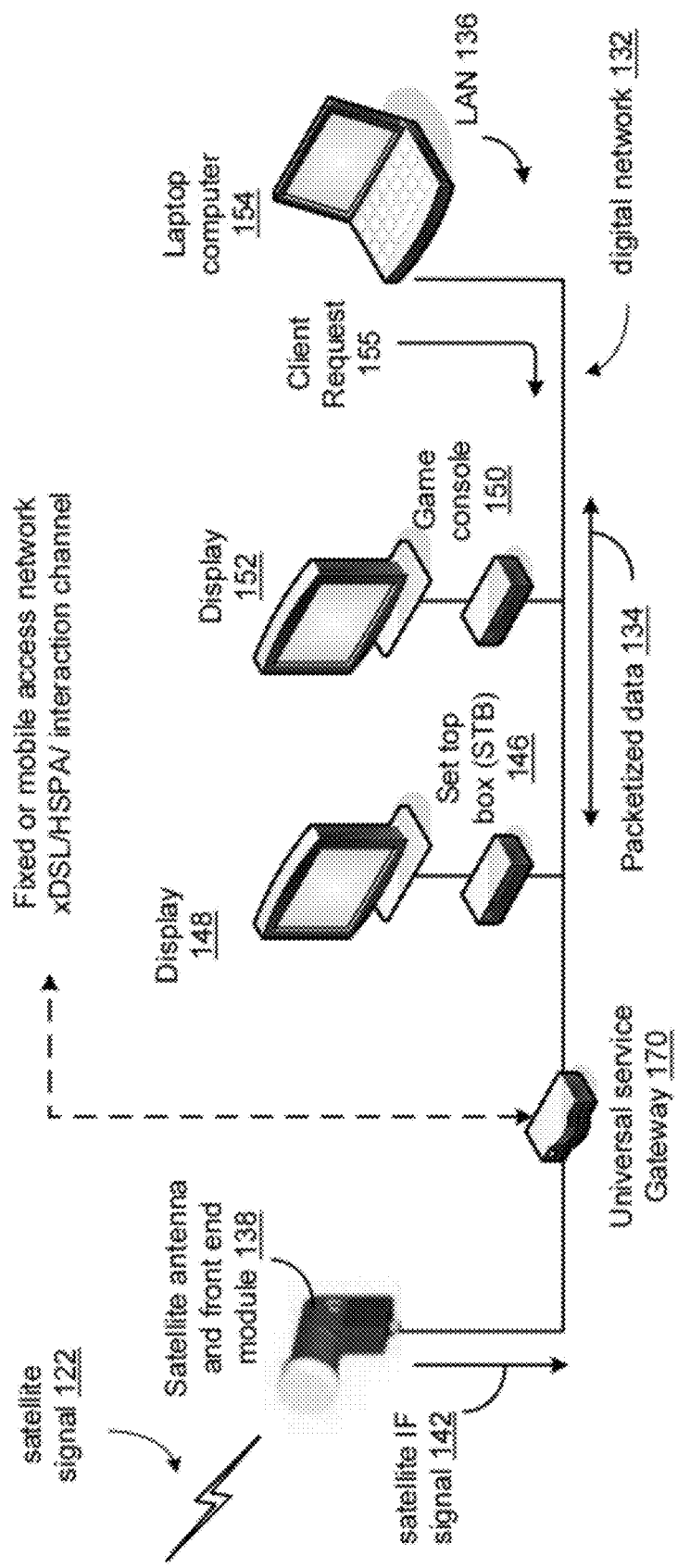
FIG. 4 is a system diagram illustrating a digital network that receives satellite digital multimedia content via a universal service gateway that includes a packet network adapter module in accordance with an embodiment of the present invention.

Provided is a device and method for receiving a satellite signal, and processing the signal and producing multimedia content for distribution over a local area network (LAN), such as that provided by an digital network. The device and method described herein receives satellite signals and provides for high-throughput processing and production of packetized data for distribution around a digital network destined for IP-based set-top boxes and customer premises equipment.

Generally, satellite-delivered multimedia, including digital video content, digital audio content and services have been confined to dedicated-satellite devices, such as to Satellite Digital Video Broadcast (DVB-S/S2) Set Top Boxes (STBs), and the like. The content-rich satellite transmissions do not provide for the reception of these signals for playback or interaction with network-based customer premises equipment (CPE).

Customer premise equipment may include personal computers (PCs) and laptops that lack the capability for reception and playback of digital satellite programs, but are otherwise communicatively coupled in a digital network. PCs, laptops, and network-attached storage (NAS) may further provide access to digital content by a Digital Media Server (DMS), which stores and makes available multimedia content to networked digital media players (DMP) and digital media renderers (DMR). Such devices may also be mobile-based, such as mobile phones, smart phones, and portable music players having capability to store and playback multimedia content, though not satellite-based content.

Other devices that may couple to the digital network, such as over wired local area networks (LAN), Wireless LAN (WLAN) or Personal Area Networks (PAN), are Personal Mobile Devices, Game Consoles (for example, Nintendo Wii, Playstation PS3, Microsoft Xbox 360, et cetera).

Additional devices that have LAN connectivity, but not the capability to receive or interact with satellite-based multimedia content, are Internet Protocol TeleVision (IPTV) STBs, which do not feature satellite tuners. Further, such network based devices can include Digital Living Network Alliance (DLNA) compliant Televisions, Media Adapters, Blu-Ray Players, et cetera.

FIG. 1 is a diagram illustrating a satellite communication system 100. The satellite communication system 100 includes a satellite transmitter 110 and satellite receiver(s) 120 communicatively coupled through a satellite 150 via satellite signals 122.

The satellite transmitter 110 may include an encoder that encodes information into a first signal type. The satellite transmitter 110 is communicatively coupled to a satellite antenna 115 that is operable to communicate with the satellite 150. The satellite transmitter 110 may also be communicatively coupled to a wired network 130. This wired network 130 may include additional network interfaces to a Wide Area Network (WAN) 126, the Internet 128, proprietary networks, and other networks.

The satellite transmitter 110 employs the satellite antenna 115 to communicate to the satellite 150 via a wireless communication channel based upon satellite signals 122. The satellite 150 is able to communicate with one or more satellite receivers 120, each having a respective satellite antenna 125.

Coupled to the satellite receiver 120 is a digital network 132. The digital network includes customer premises equipment (CPE) or network clients such as High Definition Television (HDTV) displays, PCs, laptops, network-based set top boxes, game consoles, or some other consumer electronics. For distribution of the satellite signals 122 to the digital network 132, provided is a device and method for receiving the satellite signal 122, and processing the satellite signal for high-throughput delivery, and producing multimedia content from the satellite signal 122 for distribution over a local area network (LAN) to CPE network clients. The device and method described herein receives satellite signals 122 and provides for high-throughput processing and production of packetized data for distribution to clients of the digital network 132 destined for IP-based set-top boxes and other customer premises equipment.

The digital network 132 and the satellite receiver 120 are discussed in further detail with reference to FIGS. 2-14.

With respect to channel architecture, communications to and from the satellite 150 via the satellite signals 122 may cooperatively be viewed as being a wireless communication channel, or each of the communication to and from the satellite 150 may be viewed as being two distinct wireless communication channels to satellite antenna 125.

For example, the wireless communication "channel" may be viewed as not including multiple wireless hops in one embodiment. In other embodiments, the satellite 150 receives a signal from the satellite transmitter 110 (via the satellite antenna 115), amplifies it, and relays it to the satellite receivers 120 (via respective satellite antennas 125). The satellite receivers 120 may also be implemented using terrestrial receivers such as satellite-based telephones, and satellite based Internet receivers, among other receiver types. In the case where the satellite receives a signal received from the satellite transmitter 110 (via the satellite dish 115), amplifies it, and relays it, the satellite 150 may be viewed as being a "transponder." In addition, other satellites may perform both receiver and transmitter operations in cooperation with the satellite 150. In this case, each leg of an up-down transmission via the wireless communication channel would be considered separately.

In this manner, the satellite 150 communicates with the satellite receiver 120. The satellite receiver 120 may be viewed as being a mobile unit in certain embodiments (employing a local satellite antenna); alternatively, the satellite receiver 120 may be viewed as being a satellite earth station.

The satellite IP adaptor module described herein provides CPE network clients of the digital network 132 to access satellite digital multimedia content. The satellite packet network adapter module has two general roles. The first is to relay signals that have already been encapsulated in IP packets or IP datagrams, at a satellite uplink, into the digital network 132. This functionality may be referred to as serving as a Satellite Router. The second is network adapter functionality provided for receiving digital multimedia content via the satellite signals 122, and produce packet data format of the digital multimedia content for distribution to the digital network 132. The network adapter functionality extracts the digital multimedia content from the satellite signals 122, processes the digital multimedia content at a rate to support high-throughput content access by a client, and encapsulates or packetizes the transport stream to satisfy CPE network client requests.

The packet network adapter module provides telecom operators the ability to extend their market to commercial IP television (IPTV) services, which were previously restricted to those customers to terrestrial digital subscriber line (DSL) based IPTV services. Historically, telecom operators have been unable to extend IPTV offerings beyond fifty-percent of their DSL customers due to bandwidth limitations in their access network, which is overwhelmed by the sheer volume of data contained in multimedia content, and then render to packet data format for high-throughput network access at a sufficient level of playback quality. The data flow becomes even more voluminous with the introduction, and demand, for high-definition IPTV offerings at a quality level to satisfy the customer demand.

To extend IPTV offerings, for example, telecom operators had relied on crossover technologies, such as a hybrid DSL/satellite-based services. These services, however, demanded an entire redesign of CPE devices by their associated vendors.

The packet network adapter module described herein operates to distribute satellite signals to the digital network 132 to packet-based set-top boxes and CPE network clients, providing satellite router functionality based upon a network client request.

Also, the satellite receivers 120, equipped with a packet network adapter as provided herein, allows access to satellite-based multimedia content. Also, the satellite receivers 120, may simultaneously tune to a plurality of satellite transceiver units, such as that of the satellite 150. This capability aids in multi-task functions within the digital network 132. FIGS. 2-4 provide examples of embodiments implementing a satellite-to-packet based communication devices.

FIG. 2 is a system diagram illustrating a local area network (LAN) based digital network 132 that receives multimedia content by a satellite communication system via a packet network adapter 140. The packet network adapter 140 serves a data router function for IP datagrams of the satellite signal 122, as well as a network adapter function for accessing and distributing digital multimedia content over the digital network 132.

For purposes of illustration, the digital network 132 includes customer premises equipment (CPE) 156, which includes a set top box 146 communicatively coupled to a display 148, a game console 150 communicatively coupled to a display 152, and a laptop computer 154. The CPE 156 may further include wireless LAN components, such as access point 158, which provides greater access to the packetized data 134 to other wireless devices of the digital network 132.

With respect to network adapter functionality, the packet network adapter module 140 provides digital broadcast-to-packet gateway functionality based upon a client request 155, such as that from the laptop computer 154, for example. A satellite antenna and receiver module 138 receives the satellite signal 122, and produces a satellite intermediate frequency (IF) signal 142. The satellite antenna and receiver module 138 may be implemented as a satellite antenna with a low-noise block downconverter (LNB) mounted at the signal focal point of the satellite antenna, for example.

The client request 155 includes an address of the requesting network client 156, an address of a delivery network client, and an identification of the requested digital content. The address of the delivery network client is for at least one of the network clients to receive the requested digital multimedia content. Further, the address may indicate a multicast to all of the network clients, which may be storage devices, audio playback devices, video playback devices, et cetera.

The digital content identification serves to select the multimedia content from the satellite signal 122, and also further include user state information or "cookies" for user authentication, user session identification, user preferences (such as content filters and push content permissions), et cetera.

The packet network adapter module 140 receives at least one intermediate frequency (IF) satellite signal 142, and produces therefrom packetized data 134 to the Local Area Network (LAN) 136. The LAN 136 serves as the data communications backbone for the digital network 132. The packetized data 134 may be formatted based upon the Internet Protocol (or TCP/IP), SONET, FTP, et cetera.

In this manner, the packet network adapter module 140 provides digital multimedia content access to network clients of the digital network 132 not available as packetized date (or IP datagrams) in the satellite signal 122. In other words, the packet network adapter module 140 receives and converts digital content to packetized data forwarded to CPE network clients of the digital network 132.

FIG. 3 is a system diagram illustrating a digital network 132 that receives satellite digital multimedia content as packetized data 134 via a combinational satellite receiver 160.

The combinational satellite receiver 160 includes a satellite antenna, a front end module, and packet network adapter module. These components may be wholly or partially-integrated to form the combinational satellite receiver 160, and by benefit of being coupled to a local area network (LAN) 136, may be powered remotely by the network, such as via Power-over-Ethernet (PoE).

Moreover, the device can be Universal Plug and Play (UPnP) capable with individual CPE devices, to permit LAN access to other CPE devices within digital network 132. The UPnP functionality permits networked devices, such as the laptop computer 154, game console 150, and set top box 146, as well as printers, Internet gateways, Wi-Fi access points, mobile devices, et cetera, to seamlessly discover the presence of the combinational satellite receiver 160 and establish functional network services for data sharing, communications, and entertainment.

FIG. 4 is a system diagram illustrating a digital network 132 that receives satellite digital multimedia content as packetized data via a universal service gateway 170. The universal service gateway 170 includes a packet network adapter module 140 to receive and packetize the digital content to packetized data 134, and to receive another communication system.

The universal service gateway 170 includes packet network adapter functionality and built-in gateway and return link functionality as well as the functionality of a Network Connected Tuner (NCT). The NCT functionality operates to produce and/or route packetized data 134 and other device data, as separate data streams, in combination, or both. The universal service gateway 170 supports, in addition, fixed mobile access networks. The IP-routing support-capabilities of the gateway 170 may include xDSL (Digital Subscriber Line) routing, UMTS HSPA (Universal Mobile Telecommunications System High Speed Packet Access) routing, WiMAX routing, modem couplings, et cetera.

Figure 5:
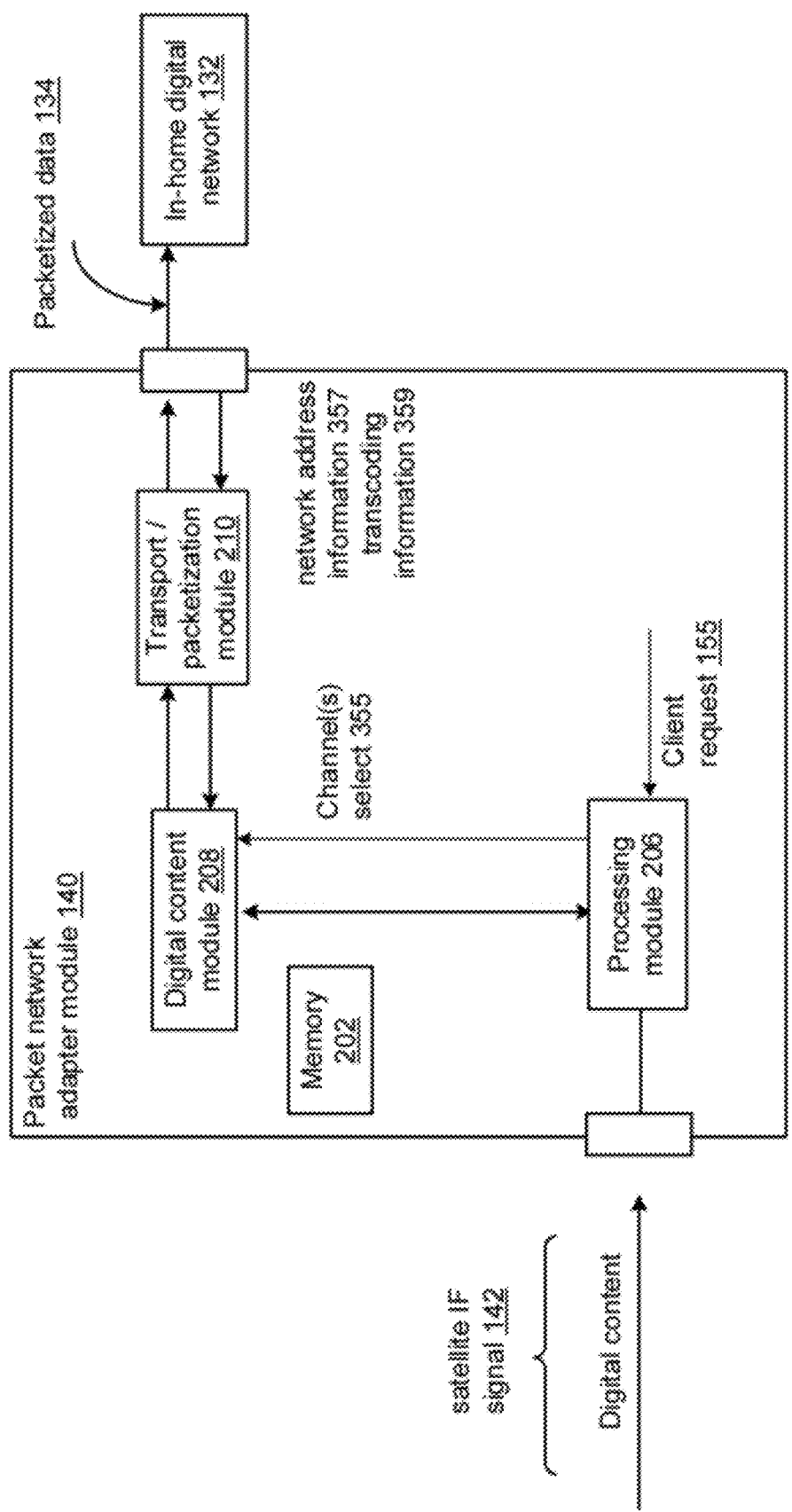
FIG. 5 is a functional block diagram of a packet network adapter module in accordance with an embodiment of the present invention.

FIG. 5 is a functional block diagram of a packet network adapter module 140, that includes a digital content module 208 and a transport/IP module 210 coupled to a processing module 206.

The processing module 206 operates to provide commands based upon a client request, such as channel selection, data delivery, et cetera. The processing module 206 may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information.

Note that when the processing module 206 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-14.

Within the packet network adapter 140, the processing module 206, the digital content module 208, the transport/IP module 210 and memory 202, may be implemented on one or more integrated circuits. For example, they may be implemented on one integrated circuit and the memory 202 may be implemented via one or more RAM (random access memory) integrated circuits. The RAM may be static RAM (SRAM), and/or dynamic RAM (DRAM).

The packet network adapter 140 receives the satellite IF signal 142, which includes at least a satellite digital content component 142-a. The packet network adapter 140 provides functionality to service the digital content.

In providing satellite router functionality, the packet network adapter module 140 receives and forwards packetized data (such as IP datagrams) within the satellite IF signals 142. Moreover, Internet service provisioning via satellite or terrestrial ISPs permits verification and/or authentication from the content provider relating to a content request by a CPE network client before permitting access to the digital content. Authentication may be provided through username and password entry at the CPE network client and provided with the client request 155, or may be based upon unit authentication such as through subscriber identity module (SIM) of a smart phone, for example.

The packet network adapter 140 is also operable in a bridging mode in which all received IP datagrams are unconditionally forwarded to the network 132. Packet network adapter module 140 may be configured manually through a graphic user interface (GUI). Under IGMP operation, the packet network adapter module 140 may be in IGMP snooping mode where the device listens for IGMP client requests from the digital network 132 and forwards the multicast group requests.

In providing network adapter functionality, the packet network adapter module 140 provides digital services to a packetized data format for distribution within the digital network 132.

The packet network adapter module 140 allows the forwarding of digital content based upon a request, to CPE network clients within the digital network 132. Based on the request(s), the network adapter module 140 tunes to a desired satellite transponder via a multiple-input/multiple-output switch and corresponding channelizer, demodulates the satellite IF signals 14 via the digital content module 208 and based upon the client request 155, and produces the packetized data 134 based upon services and/or content requested by the CPE network clients through the network client request 155. The data packet 134 is forwarded to the requesting network client, or to another network client per the client request 155 (such as a monitor, a device with a display, et cetera). The packetized data 134 is a copy of the incoming service stream of the digital content and contains service related components and tables, including a transparent forwarding of all conditional access related information.

Still referring to FIG. 5, packet-based clients are supported by the network adapter module 140, which operates as a digital media server for live television and radio services or multimedia services to clients of the network 132. CPE network clients of the digital network 132 can be made aware with the adapter module 140 incorporating Universal Plug and Play (UPnP) capabilities, in which the clients are aware of the presence of the packet network adapter module 140 through an UPnP discovery mechanism. These CPE network clients are able to discern the services available through the adapter 140 by browsing a Content Directory Service (CDS). The adapter 140 forwards the data using IP protocols and formats to CPE network clients.

In multicast mode, the packet network adapter module 140 may forward the digital content of the satellite IF signal 142 to CPE network clients through network address multicast addressing. The digital video module 208 maps digital video services to multicast addresses using a notification table ("broadcast over satellite"), or using a static mapping defined within configuration settings inside the adapter module 140, which may be stored in the memory 202. The notification table may further include authentication and verification information relating to the CPE network clients for access to multimedia content.

Figure 6:
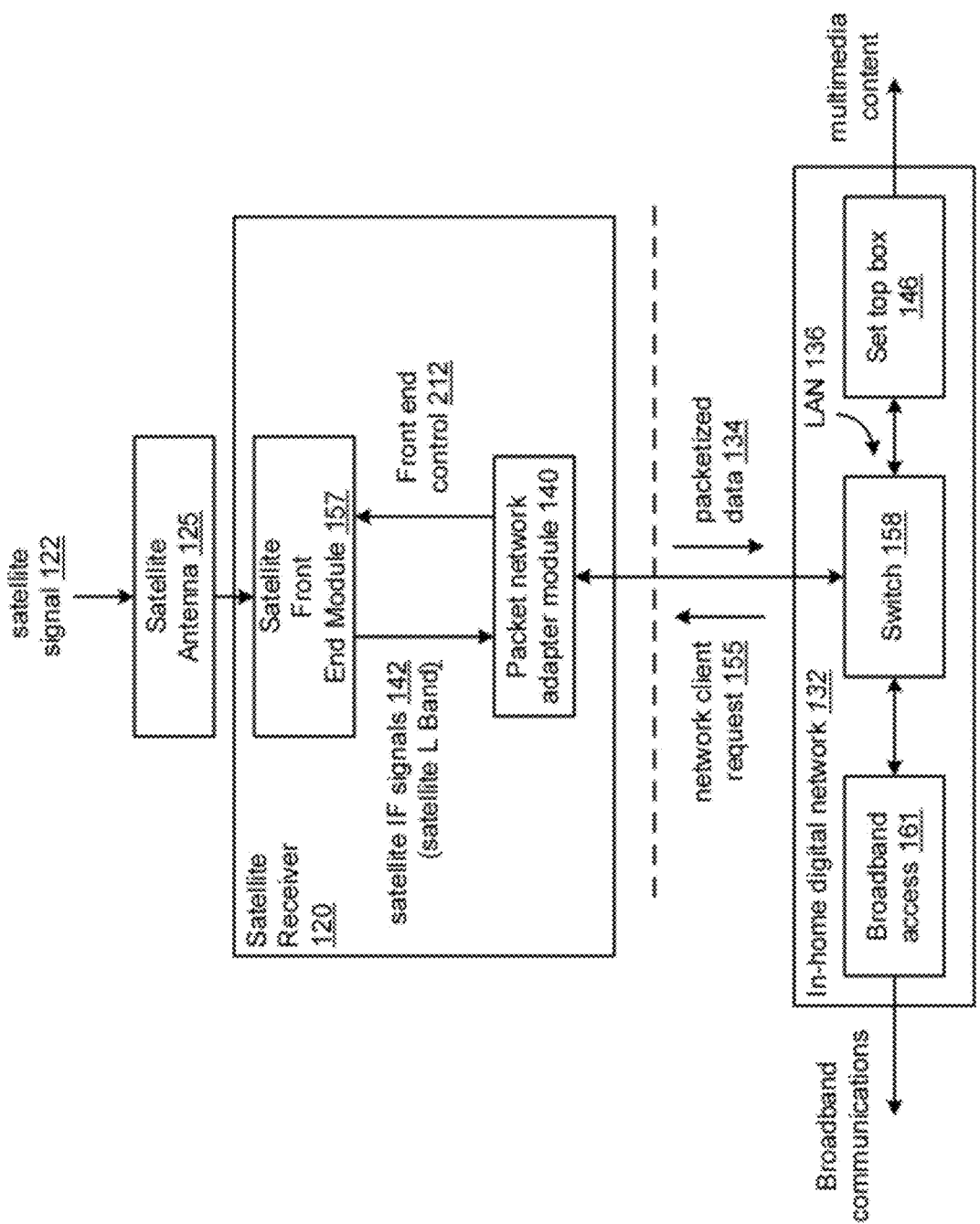
FIG. 6 is a block diagram illustrating a satellite receiver that includes a satellite front end module and a packet network adapter module in accordance with an embodiment of the present invention.

FIG. 6 is a block diagram illustrating the satellite receiver 120 that includes a satellite front end module 157 and a packet network adapter module 140. The satellite receiver 120 is communicatively coupled to the satellite antenna 125 to receive the satellite signal 122. As may be appreciated, the satellite front end module 157 may be collocated with the satellite antenna 125, such as a low-noise block downconverter (LNB) positioned at the parabolic focal point of a satellite antenna.

The digital network 132 receives communication services via the satellite antenna 125 and the satellite receiver 120. The digital network 132 includes network components that may form a portion of a LAN 136. For example, the digital network 132 includes a switch 158, which routes IP datagrams and/or the packetized data 134 to network clients, such as broadband access 161 and a set top box (STB) 146 via the LAN 136. As may be appreciated, examples of broadband access include Digital Subscriber Line (DSL) technologies, Broadband-Integrated Digital Services Network (B-IDSN) technologies, Very-High Bitrate DSL (VDSL) technologies, et cetera. Also, the switch 158 may be part of an access gateway or wireless access point, to which other network clients (for example, computers 154, STBs 146, game consoles 150, et cetera (see FIGS. 2-4), are also communicatively coupled.

The satellite dish 125 and satellite front-end module 154 receives the satellite signal 122, which is generally provided in a Ku Band ranging from 10.95 to 14.5 GHz, and down-converts the signal 122 to an intermediate frequency (IF) signal, generally to an L Band frequency in satellite applications (from about 1 GHz to about 2 GHz). The L-Band frequency varies upon the geographic/political regions where the satellite reception occurs.

The packet network adapter module 140 receives the satellite IF signals 142 for conversion of digital video or multimedia content to packetized data 134 based upon a network client request 155. The network adapter module 140 also provides a front end control 212 that operates to refine the tuning of the satellite signal via the satellite front end module 154 based upon the quality of the received satellite IF signals 142.

Network adapter module 140 receives the satellite IF signals 142, selects one or more conventional digital video multimedia services or IPTV services, based upon the client request 155, and forwards them to the local network 132 via the packetized data 134.

Figure 7:
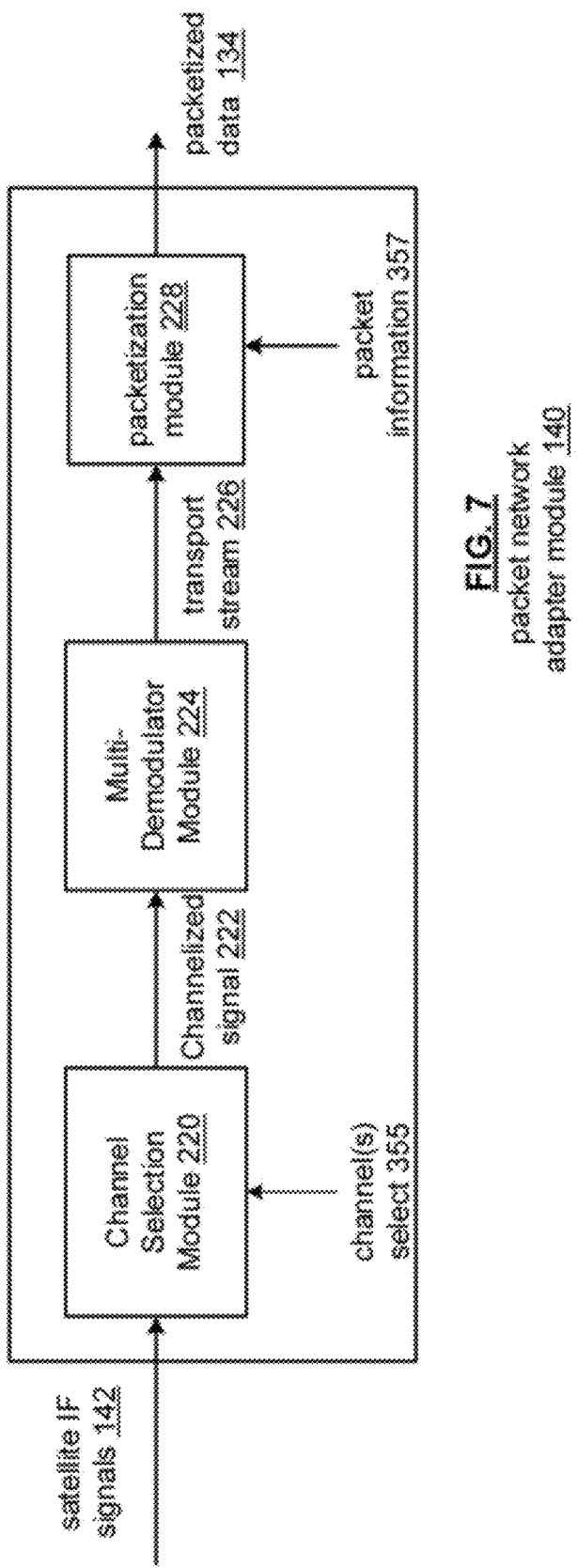
FIG. 7 is a block diagram illustrating a packet network adapter module according to another embodiment of the present invention.

FIG. 7 is a block diagram illustrating the packet network adapter module 140. The packet network adapter module 140 includes a channel selection module 220, a multi-demodulator module 224, and a packetization module 228.

The channel selection module 220 receives the satellite IF signals 142 and accommodates multimedia content, which is in a data format dissimilar to an IP datagram or packetized data for packet network distribution. The channel selection module 220, based upon the channel(s) select 355 (from the client request 155 (see FIG. 2-5)), produces channelized signals 374-1 through 374-M, which the multi-demodulator module 224 receives and produces a transport stream 226. The packetization module 228 receives the transport stream 226, and produces therefrom packetized data 134 based upon packet information 357 from the client request 155. The packetized data 134 is provided for delivery of the digital video content to a network client based upon a delivery address in response to the client request 155.

The channel selection module 220 operates to avoid receiver saturation, in which the receiver cannot adequately down convert signals or process a users' content request for rendering high definition multimedia content of a digital video signal, while also minimizing power usage and maintain linearity of the signal processing, to thereby avoid processing saturation. Operation of the channel selection module 220 is discussed in further detail with respect to FIGS. 9-12.

Figure 8:
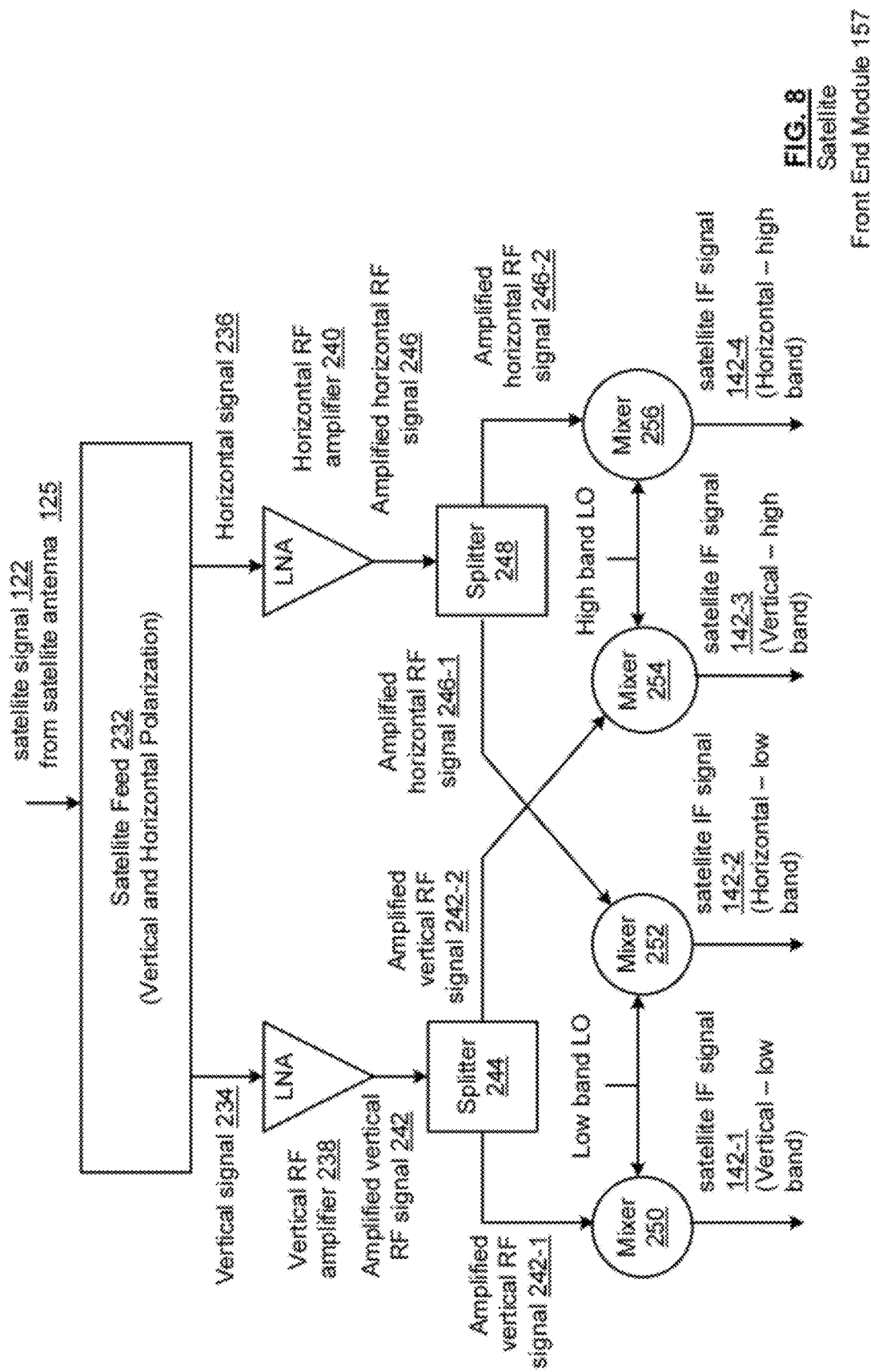
FIG. 8 is a block diagram illustrating a satellite front end module for servicing satellite communication signals in accordance with an embodiment of the present invention.

FIG. 8 is a block diagram illustrating a satellite front end module 157 for servicing satellite communication signals. In the example of FIG. 8, the front end module 157 has a low noise block downconverter (LNB) architecture that provides an initial processing stage for the satellite signal 122. From the satellite signal 122, the satellite front end module 157 produces a plurality of intermediate frequency (IF) signals, as described below.

The satellite front end module 157 includes a satellite feed 232 that receives the satellite signal 122 via the satellite antenna 125. The satellite feed 232 produces vertical signal 234 and horizontal signal 236, which are polarized components of the satellite signal 122.

Generally, a satellite signal is polarized at the satellite transmitter to produce a more concentrated beam. Satellite transmissions may be polarized in one of four different ways: linear (horizontal or vertical) or circular (left-hand or right-hand). For example, fixed service satellites (FSS), which are geostationary communications satellites, utilize horizontal and vertical polarization. Direct broadcast satellites (DBS) use left- and right-hand circular polarization.

Moreover, to increase satellite broadcast efficiency, which also increases the data throughput, both horizontal and vertical linear polarization (and left- and right-hand circular polarization) may be applied simultaneously per channel or frequency. In such cases the frequency of one of the two is slightly altered, to avoid possible interference. Horizontal and vertical transmissions will therefore not interfere with each another because they are differently polarized. As a result, twice as much digital video programming content can be transmitted per satellite.

To accommodate the polarization of the satellite signal 122, the satellite feed 232 includes a polarizer, which may be provided as a mechanical polarizer, a ferrite/magnetic polarizer, and/or an electrically controlled polarizer. The polarizer operates to select the polarized components of the satellite signal 122.

In the further example of the satellite front end module 157 of FIG. 7, vertical and horizontal linear polarization examples are used to describe the processing of the satellite signal 122, with the understanding that the polarization technique described does not serve to limit the function and other capabilities to a single polarization technique.

Vertical RF amplifier 238 receives the vertical signal 234 and produces an amplified vertical RF signal 242. The horizontal RF amplifier 240 recites the horizontal signal 236 and produces amplified horizontal RF signal 246. Splitter 244 receives the amplified vertical RF signal 242 and produces amplified vertical RF signal 242-1 and 242-2. Mixer 250 receives the amplified vertical RF signal 242-1 and the mixer 252 receives the amplified horizontal RF signal 246-1, and based upon the low band local oscillator (LO), mixer 250 and 252 produce satellite IF signals 142-1 and 142-2, respectively.

Splitter 248 receives the amplified horizontal RF signal 246 and produces amplified horizontal RF signals 246-1 and 246-2. Mixer 254 receives the amplified vertical RF signal 242-2 and the mixer 256 receives the amplified horizontal RF signal 246-2. Based upon the high band LO, mixer 254 and 256 produce satellite IF signals 142-3 and 142-4.

In this manner, the satellite front end module 157 produces four IF signal outputs. The satellite IF signal 142-1 has vertical polarization and low band characteristics. The satellite IF signal 142-2 has horizontal polarization and low band characteristics. The satellite IF signal 142-3 has vertical polarization and high band characteristics. The satellite IF signal 142-4 has horizontal polarization and high band characteristics. Moreover, as may be appreciated, the IF signals 142-1 through 142-4 may be further amplified or processed to provide further signal strength for subsequent signal processing by the network adapter 140.

Figure 9:
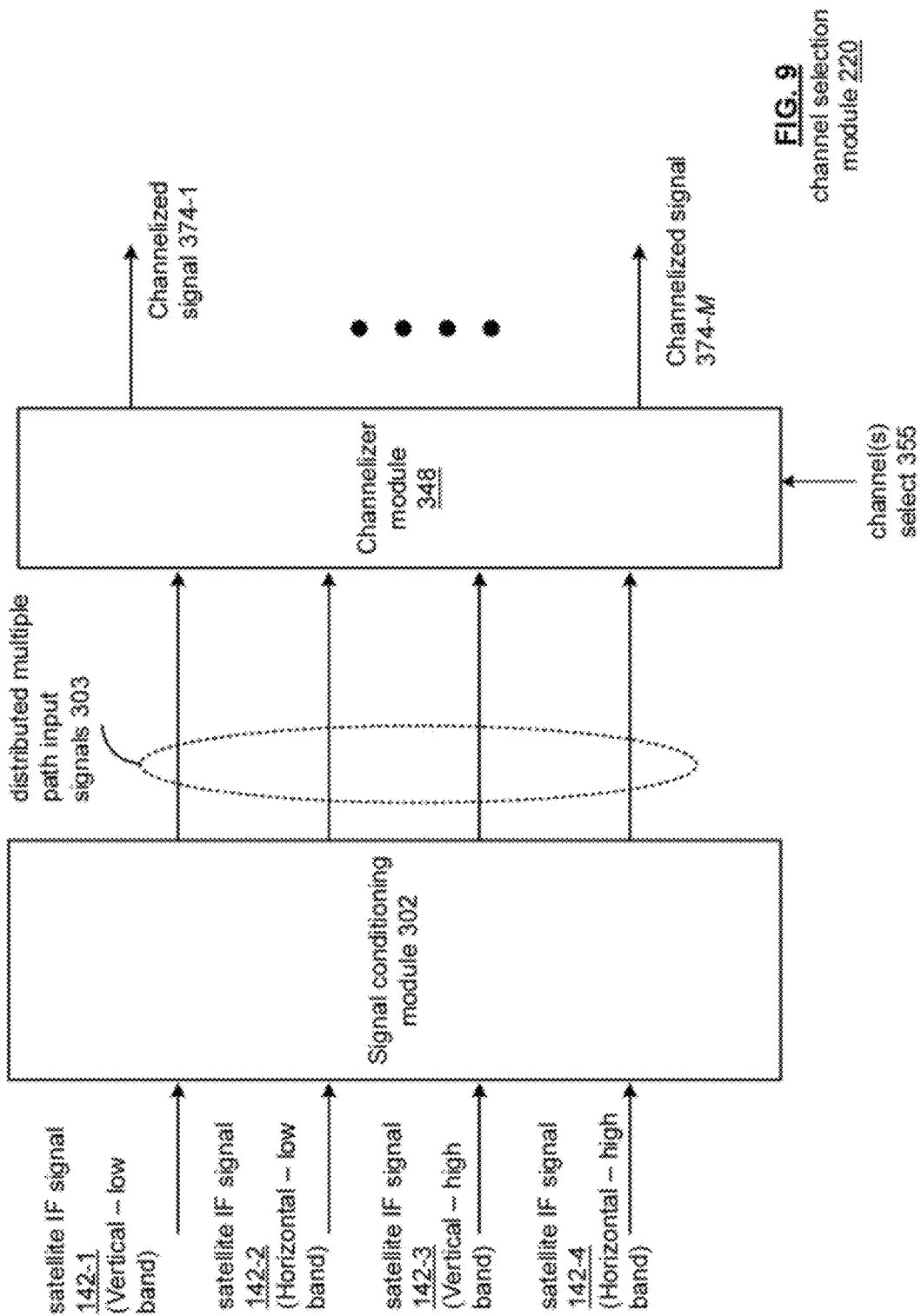
FIG. 9 is a simplified block diagram of a channel selection module of the packet network adapter module in accordance with an embodiment of the present invention.

FIG. 9 is a simplified block diagram of a channel selection module 220, which includes a signal conditioning module 302, and a channelizer module 348. The signal conditioning module 302 receives the satellite IF signals 142-1, 142-2, 142-3 and 142-4 from the satellite front end module 157 (see, e.g., FIG. 8). The signal conditioning module 302 produces therefrom distributed multiple path input signals 303.

The distributed multiple path input signals 303 serve to distribute the satellite IF signals 142-1 to 142-4 with manageable portions for distributed processing by the channelizer module 348. For example, 1 GHz wide horizontal and vertical band signals may be portioned into 600 MHz units for more ready processing. The channel selection module 220 avoids saturation, promoting high-throughput processing of the digital content contained within the satellite signals 122 (see, e.g., FIG. 1). As one skilled in the art may appreciate, multiple path input signal generation may not be a prerequisite as the processing efficiency of the packet network adapter module 140 increases over time due to integrated circuit advances, permitting the module to receive the satellite IF signals 142 from the satellite front end module 157.

Moreover, the signal conditioning module 302 further operates to filter each of the IF signals at a discrete frequency band, and may further down convert the filtered IF signal to produce a downconverted input signal of the distributed multiple path input signals 303. The channelizer module 348 receives the distributed multiple path input signals 303 and. produces channelized signals 374-1 through 374-M The operation of the signal conditioning module 302 and the channelizer module 348 are discussed in further detail with reference to FIGS. 10 and 11.

Figure 10:
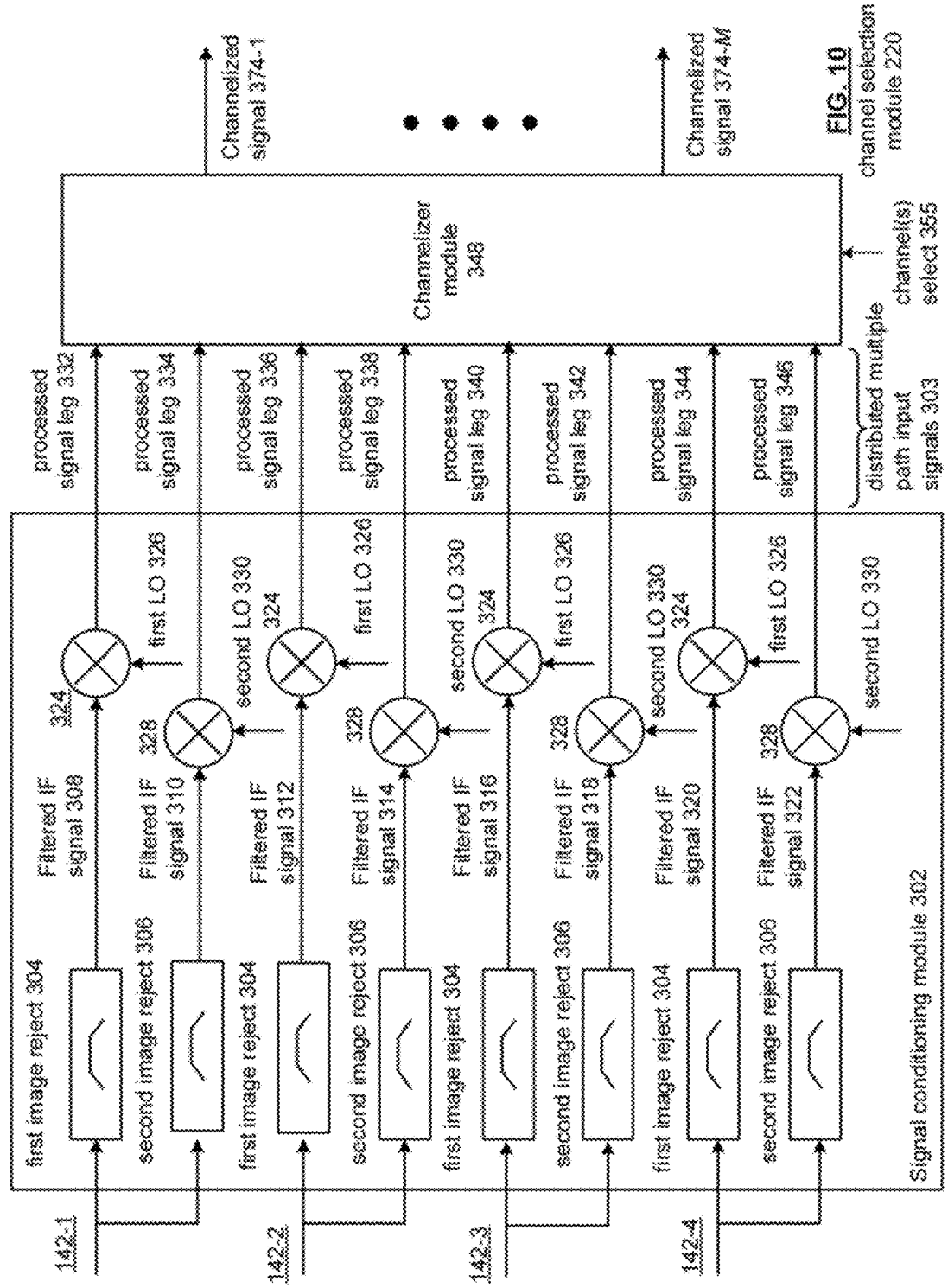
FIG. 10 is a block diagram of the channel selection module of FIG. 9.

FIG. 10 is a block diagram of the channel selection module 220. The signal conditioning module 302 splits each of the satellite IF signals 142-1 to 142-4 into leg pairs.

The signal conditioning module 302 further operates to filter each leg of the IF signals at a discrete frequency band with first image reject 304 and second image reject 306 of the pair to produce filtered IF signals 308 to 322, and downconverts a first leg with first mixer 324 at a first local osculation 326 and a second leg with second mixer 328 at a second local oscillation 330 to produce distributed multiple path input signals 303 that include processed signal legs 332 through 346. A frequency range in which the distributed multiple path input signals 303 in the 250-870 MHz range. Further filtering may be provided to the mixers 324 and 328 outputs for anti-aliasing of the signals.

In the example provided, the distributed multiple path input signals 303 are received by the channelizer module 348 on a N×M matrix basis to provide M output channels in the channelized signals 374-1 through 374-M, as is discussed in further detail with reference to FIG. 11.

Figure 11:
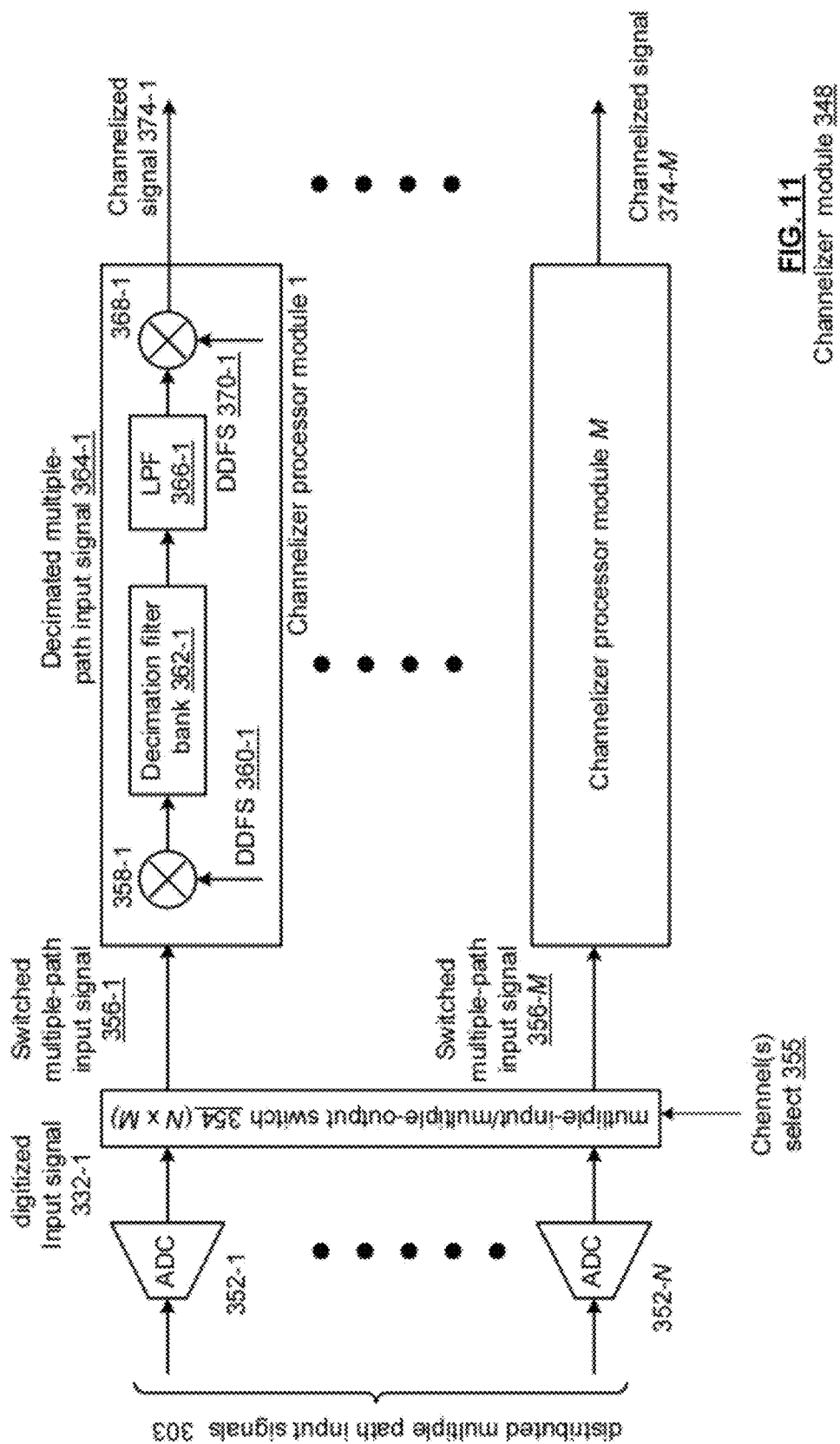
FIG. 11 is a block diagram illustrating an N-input channelizer module of FIG. 10.

FIG. 11 is a block diagram illustrating an N-input channelizer module 348. The channelizer module 348 has N-inputs that receive the distributed multiple path input signals. In operation, the channelizer module 348 tunes the signals 303 with channelizer modules 1 through M, and produces M-channelized signals 374-1 through 374-M. In the embodiment of FIG. 11, the distributed multiple path input signals 303 are digitized by analog-to-digital converters 352-1 through 352-N, and provide input to multiple-input/multiple-output switch 354 having a N×M matrix to facilitate concurrent processing of the distributed multiple path input signals 303 via switched multiple-path input signals 356-1 to 356-M.

In operation, the multiple-input/multiple-output switch 354 distributes the input signal 322-1 to 322-N received at each of its N input ports to one or more of its M output ports, and may be a fully implemented or partially implemented multiple-input/multiple-output switch. A fully implemented multiple-input/multiple-output switch may provide full distribution flexibility for each of the N modulated data streams such that each of the N modulated data streams, coupled to respective N inputs, to be distributed to any number and any specific ones of its M output ports. The distribution of the input signal is based upon the channel select 355. The channel select 355 is based upon information contained within the network client request 155 (see FIGS. 1-3). The plurality of channelizer modules 1 through M operate to channelize, or tune, the switched multiple-path input signals 356-1 to 356-M in a substantially concurrent fashion to produce a plurality of channelized signals 374-1 through 374-M. The channelizer modules 1 to M include the similar components to tune the channels. In this regard, the channelizer module 1 is discussed as representative of the multiple channelizer modules 1 through M. The channelizer module includes a digital mixer 358-1 to digitally down convert a sampling rate of the switched multiple-path input signal 356-1 based upon the direct digital frequency synthesis (DDFS) 360-1, decimated by the decimation filter bank 362-1 to produce decimated multiple path input signal 364-1, filtered by the LPF 366-1, and further downconverted by digital mixer 368-1 at the rate dictated by the DDFS 370-1, to tune the switched multiple-path input signal 356-1 to produce the channelized signal 374-1 through 374-M.

Each of the channelized signals 374-1 through 374-M are a modulated signals including a sequence of symbols, pieces of data represented by a corresponding signal state, for example, a bit or a few bits, based upon the modulation scheme used for the digital video content, such as QPSK modulation for a DVB-S specification, 8-PSK or 16-QAM for a DVB-DSNG (digital satellite news gathering) specification, QPSK, 8-PSK, or 16-APSK (amplitude and phase shift keying) for a DVB-S2 specification, et cetera.

Figure 12:
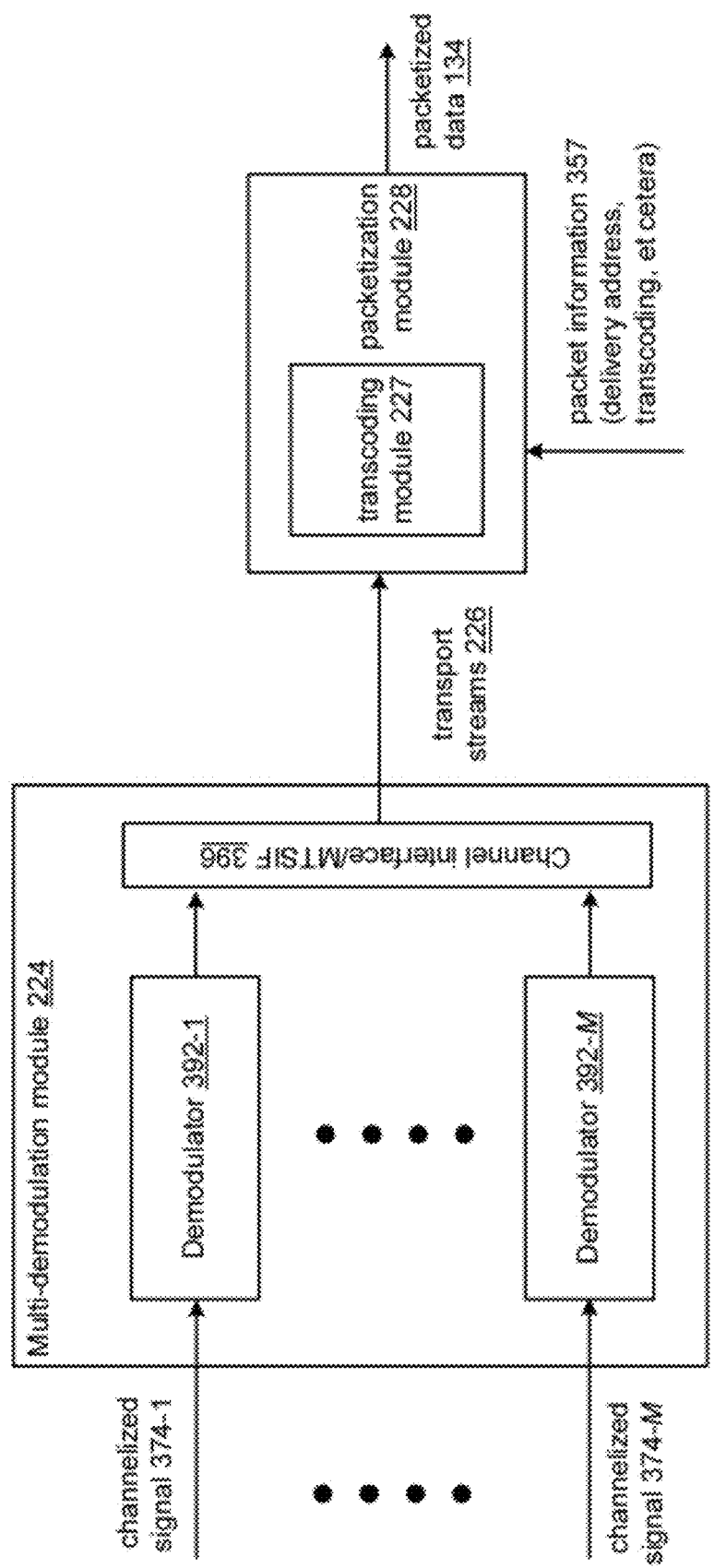
FIG. 12 is a block diagram illustrating the multi-demodulation module and packetization module of the packet network adapter module of FIG. 7.

FIG. 12 is a block diagram illustrating the multi-demodulation module 224 and packetization module 228 of the packet network adapter 140.

The multi-demodulation module 224 includes a bank of demodulators 392-1 to 392-M, and a channel interface/multiplexed transport stream interface (MTSIF) 396. The each of the demodulators 392-1 to 392-M may include suitable logic, circuitry, interfaces and/or code that may be operable to incorporation and/or support concurrent use of multiple demodulator integrated circuits, along or in combination with each other.

As shown, the demodulators 392-1 to 392-M support demodulation of multiplexed transport related data and/or signals, via a channel interface/multiplexed transport interface (MTSIF) 396. The MTSIF 396 produces a transport stream 226, which is in a multiple program transport stream (MPTS) format (such as per the MPEG-TS specifications), that offers more than one program service.

In operation, the bank of demodulators 392-1 to 392-M support concurrent demodulation operations, which may provide tuning into different digital video broadcast channels at substantially the same time. In this regard, the MTSIF 396 provides multiplexing data and/or information communicated by the demodulators 392-1 to 392-M into corresponding elements and/or signals within the MTSIF 396. In this manner, the multi-demodulator module 224 operates to further minimize the saturation of the receiver 120 to provide throughput capability to the digital network 132.

The packetization module 228 receives the transport stream 226, and as may be appreciated, packetizes the transport stream 226 that carries the selected digital channels based upon the network client request 155 (see, e.g., FIGS. 2 and 3). The delivery may be to the requesting device, to another IP network client, or a combination of IP network clients as indicated by packet information 357 of the network client request 155. Moreover, the multimedia content may be a push-based service tailored to filter criteria or permissions indicated by the network client request.

Moreover, the packetization module 227 may include a transcoding module 227 to transcode the transport streams 226 prior to packetization. The transcoding module 227 operates to convert the multimedia content and/or transmission medium compatibility of the transport stream 226 to another format, such as for video data file or audio data files, or different network physical layer structures. The transcoding may be directed towards instances where the target network client device (for example, a tablet device, a smart phone device, et cetera) identified by the network client request 155 (see, e.g., FIGS. 2 and 3) does not support the format of the multimedia content from the satellite feed or that the device has limited storage capacity.

Figure 13:
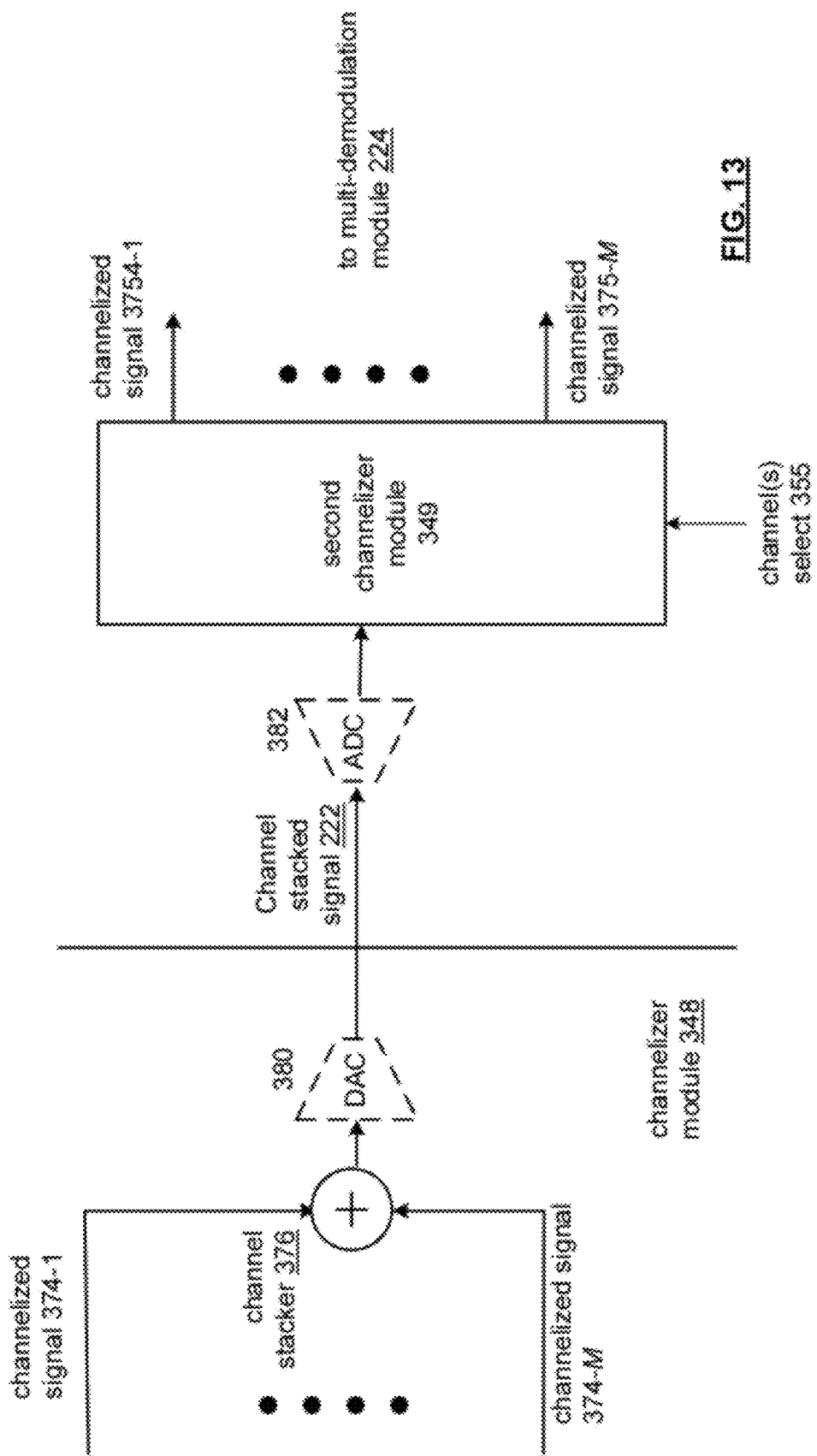
FIG. 13 is a block diagram illustrating analog channel stacked signal transport from the channelizer module in accordance with a further embodiment of the present invention.

The transcoding module 227 operates in response to produce the data in the desired format, such as in a reduced file size, or to convert incompatible or obsolete data to a compatible or updated format. Transcoding may also accommodate different architectures of digital network 132. For example, though an Ethernet or IEEE 802.x network PHY is considered the base PHY for networks, other packetized network PHY or Physical Layer architectures are present in the networking environment. For example, the physical layer may be implemented through power lines in a building or residence (such as HomePNA specifications), Ethernet architectures (IEEE 802.3x specifications) various wireless-based architectures (for example, 802.11 specifications), coaxial based networks (for example, Multimedia over Coax Alliance (MoCA) specifications), et cetera. FIG. 13 is a block diagram illustrating analog transport from the channelizer module 348 and the multi-demodulation module 224. The transport provides a further example of data transport when separate integrated circuits are used to provide processing functionality as described herein. In this example, a digital data output is converted to the analog domain for transport to another processing function provided by another integrated circuit, which in the present example is the multi-demodulation module 224.

To facilitate the inter-IC transport, the channelized signals 374-1 through 374-M are received by channel stacker 376, and stacked and converted by digital-to-analog converter 380 to produce a channel stacked signal 222 in the analog domain, which in effect is a transport stream carrying unpopulated channel data. In the present example, the multi-demodulation module 224 includes an analog-to-digital converter (ADC) 382. The ADC 382 converts the channel stacked signal 222 to the digital domain for processing, or channelization, of the channel stacked signal 222 by the second channelizer module 349 to produce the channelized signals 375-1 through 375-M based upon the channel(s) select 355 or another channel(s) select. The second channelizer module 349 provides the channelized signals 37-1 through 375-M to the bank demodulator 392-1 to 392-M (see FIG. 12).

In another embodiment, the channel stacked signal 222 may be provided to a second packet network adapter IC. The second packet network adapter module may forego signal conditioning in view of the conditioning performed by the first packet network adapter module.

The DAC 380 and ADC 382 are shown in hashed lines to indicate optional use to provide digital/analog operation. In the alternative, the inter-IC transport may take place in the analog domain, as may the operation of the packet network adapter module 140 (see, e.g., FIGS. 1-5).

Figure 14:
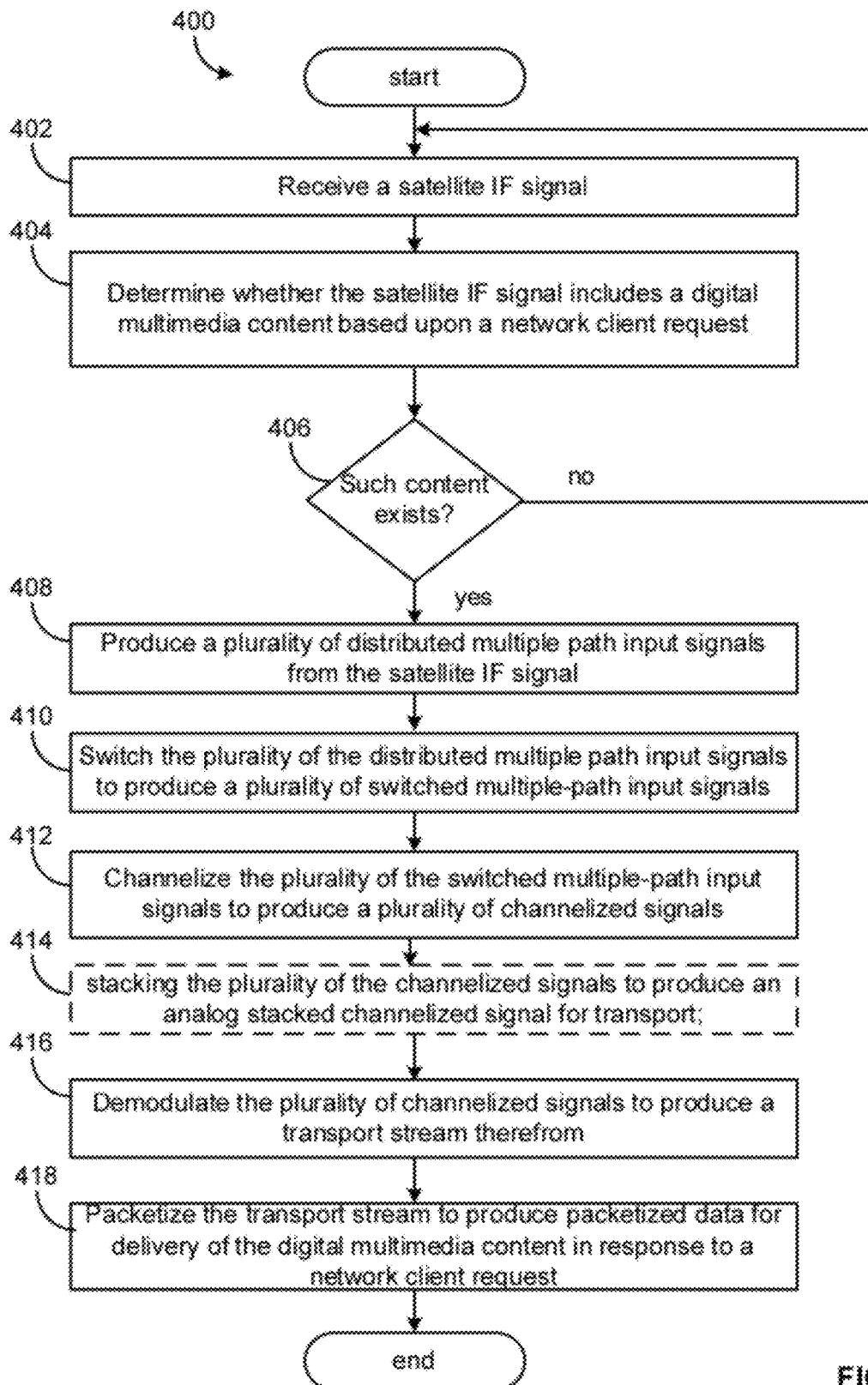
FIG. 14 is a flowchart of a method in a packet network adapter module to process multimedia content of a satellite signal to produce packetized data in accordance with an embodiment of the present invention.

FIG. 14 is a flowchart of a method 400 for use in a packet network adapter to process digital video content of a satellite signal based upon a network client request. At step 402, the packet network adapter receives a satellite intermediate frequency (IF) signal. The satellite IF signal is produced from a satellite signal, and may be further produced by a low noise block downconverter positioned at a parabolic focal point of a satellite antenna. At step 404, the packet network adapter determines whether the satellite IF signal includes the desired digital content based upon a network client request. The network client request is provided by a network client via the digital network 132, in an IP datagram format. The network client request may be for one or many digital video programming content channels provided by the satellite communications system 100 (see FIG. 1). In this regard, several packets of the packetized data 134 may be generated for delivery to a network client or clients of the digital network 132.

The network client request for digital video content may be premised on a subscription of a client with a content provider. The request may also serve as a verification and authentication request, in which the packet network adapter verifies access to the digital video content service via datagrams (such as IP datagrams) over a satellite communication system 100 (see FIG. 1) with a content provider. The authentication may be provided from the network client by a username/pas sword verification, as well as a response from the content provider verifying the authenticity of the request. Moreover, such verification/authentication information may reside in the packet network adapter, such as in memory 202, or on a subscriber identity module (SIM) of a smart phone, for example.

At step 406, when the digital video content exists or is otherwise available based upon the network client request, then processing of the digital content proceeds. Otherwise, the method 400 returns to step 402 for further processing of satellite IF signals.

At step 408, the packet network adapter produces a plurality of distributed multiple path input signals from the satellite IF signal, and switches, at step 410, the plurality of the distributed multiple path input signals to produce a plurality of switched multiple-path input signals. The multiple paths effect to distribute the processing of the digital video content, which contains a large amount data generally, and more so with respect to high-definition content, generating a large bandwidth for the satellite signals in general. Distribution of the processing provides for alleviating the occurrence of network adapter saturation in processing and providing the content to the requesting client, or clients, of the digital network.

At step 412, the packet network adapter channelizes the plurality of the switched multiple-path input signals, in a concurrent fashion, to produce a plurality of channel signals. In a further embodiment, to facilitate the transportation between integrated circuit components, the plurality of channel signals are stacked at step 414 (indicated in phantom lines) to produce a stacked channel signal and converted into the analog domain and transported for demodulation, in which the stacked channel signal is restored to the digital domain prior to demodulation.

Each of the plurality of channel signals, at step 416, is demodulated to produce a channel transport stream therefrom. At step 418, the packet network adapter translates the channel transport stream to produce an IP-based signal program transport stream for delivery of the digital content to a network client based upon the network client request.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "operable to" indicates that an item includes one or more of power connections, input(s), output(s), etc., to perform one or more its corresponding functions and may further include inferred coupling to one or more other items. As may still further be used herein, the term "associated with," includes direct and/or indirect coupling of separate items and/or one item being embedded within another item. As may be used herein, the term "compares favorably," indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A packet network adapter to provide satellite signal content access to a customer premises equipment local area network ("local area network") client device, the packet network adapter comprising:
a first channel selection module coupled to receive at least one satellite intermediate frequency (IF) signal of a plurality of satellite IF signals provided to customer premises that includes a local area network, wherein the at least one satellite IF signal being selected based upon a network client request received via the local area network coupled to the packet network adapter and produce therefrom a plurality of channelized signals, the network client request including a channel select, state information, an address of the requesting local area network client, and a local area network client address that identifies at least one target local area network client device, the network client request enabling satellite router functionality responsive to the requesting local area network client for delivery of a transport stream of a plurality of transport streams to the at least one target local area network client device via the local area network;
a channel stacker to receive and combine the plurality of channelized signals to produce a channel stacked signal;
a digital-to-analog converter to receive the channel stacked signal and produce an analog domain channel stacked signal therefrom;
an analog-to-digital converter to receive the analog domain channel stacked signal and reproduce the channel stacked signal therefrom;
a second channel selection module to receive the reproduced channel stacked signal from the analog-to-digital converter and reproduce the plurality of channelized signals therefrom;
a multi-demodulator module coupled to the second channel selection module to receive the plurality of channelized signals as reproduced and produce the plurality of transport streams therefrom; and
a packetization module to packetize the plurality of transport streams to produce packetized data for delivery of the satellite signal content to the at least one target local area network client device responsive to the network client request and as permitted by the state information, the packetized data supporting a PHY configuration of the at least one target local area network client device, wherein the packetization module includes a transcoding module configured to transcode at least one of the plurality of transport streams to support a multimedia format based upon the network client request, the multimedia format distinct from the PHY configuration.

2. The packet network adapter of claim 1, wherein a satellite front end module is operable to produce the at least one satellite IF signal from a received satellite signal, the at least one satellite IF signal including digital content having a data format dissimilar to a packetized data format.

3. The packet network adapter of claim 2, wherein the satellite front end module comprises a low noise block downconverter (LNB), wherein the LNB is mounted at a parabolic focal point of a satellite antenna to receive satellite signals.

4. The packet network adapter of claim 1, wherein the transcoding module is further configured to transcode, based upon the network client request, at least one of the plurality of transport streams to support the PHY configuration of the at least one target local area network client device.

5. The packet network adapter of claim 2, wherein the network client request further includes:
an identifier of the digital content, the identifier including a channel select.

6. The packet network adapter of claim 5, wherein the network client request further includes state information pertaining to the requesting local area network client.

7. The packet network adapter of claim 5 wherein the requesting local area network client is also the at least one target local area network client.

8. The packet network adapter of claim 1, wherein the first channel selection module and the channel stacker are implemented by a first integrated circuit, and wherein the second channel selection module is implemented by a second integrated circuit.

9. A method in a local area network (LAN) adapter for satellite content reception by a packet-based customer premises equipment local area network client, the method comprising:
receiving a satellite intermediate frequency (IF) signal, wherein the satellite IF signal is downconverted from a satellite signal;
determining whether the satellite IF signal includes digital multimedia content responsive to a received content request from a requesting LAN client via the LAN, wherein the digital multimedia content is not in a packetized data format and the content request includes a channel select, state information, an address of the requesting LAN client, and a LAN client address that identifies at least one target LAN client device of a plurality of LAN client devices, the content request enabling satellite router functionality responsive to the requesting LAN client for delivery of requested digital multimedia content to the at least one target LAN client device;
when the satellite IF signal includes the requested digital multimedia content identified by the content request:
producing a plurality of distributed multiple path input signals from the satellite IF signal;
switching the plurality of the distributed multiple path input signals to produce a plurality of switched multiple path input signals based upon the content request;
selectively channelizing at least one of the plurality of switched multiple path input signals to produce a plurality of channel signals;
combining the plurality of channel signals to produce a channel stacked signal;
converting the channel stacked signal into an analog domain channel stacked signal;
converting the analog domain channel stacked signal into the digital domain to produce a reproduced channel stacked signal;
reproducing the plurality of channel signals from the reproduced channel stacked signal;
demodulating the reproduced plurality of channel signals to produce a plurality of channel transport streams therefrom;
determining, based at least in part on the content request, a multimedia format for the requested digital multimedia content;

transcoding at least one of the plurality of channel transport streams to support the multimedia format; and packetizing the transcoded at least one of the plurality of channel transport streams to produce packetized data for delivery of the requested digital multimedia content to the at least one target LAN client device of a plurality of LAN clients responsive to the content request and as authorized per the state information.

10. The method of claim 9, wherein a low noise block downconverter (LNB) downconverts the satellite signal to the satellite IF signal.

11. The method of claim 10, wherein the LNB is mounted at a focal point of a parabolic satellite antenna to receive the satellite signal.

12. The method of claim 9, wherein the content request further includes:
identification of the requested digital multimedia content, wherein the identification includes the channel select.

13. The method of claim 12, wherein the content request further includes state information pertaining to the at least one target LAN client.

14. The method of claim 12 wherein the requesting LAN client is the at least one target LAN client device.

15. The method of claim 9, wherein switching the plurality of the distributed multiple path input signals to produce a plurality of switched multiple path input signals is provided by a multiple-input/multiple-output switch having an N input and M output matrix to facilitate processing of a multiple path input signal of the plurality of switched multiple path input signals based upon the content request.

16. The method of claim 9, further comprising:
communicating the analog domain channel stacked signal from a first integrated circuit to a second integrated circuit, wherein the second integrated circuit generates the reproduced plurality of channel signals.

17. A local area network (LAN) adapter for a satellite receiver to interface with a packet-based network client, the LAN adapter comprises:
a signal conditioning module configured to receive a plurality of satellite IF signals at a customer premises and to produce therefrom a plurality of distributed multiple path input signals, wherein each of the distributed multiple path input signals is a downconverted split signal of a satellite IF signal of the plurality of satellite IF signals;
a first channelizer module coupled to receive at least one of the plurality of distributed multiple path input signals and produce a plurality of channelized signals based upon a network client request received via a customer premises equipment LAN, the network client request including a channel select, state information, an address of a requesting network client of the customer premises equipment LAN, and a network client address to identify at least one target network client device of the customer premises equipment LAN, the network client request enabling satellite router functionality responsive to the packet-based network client for delivery of a transport stream of a plurality of transport streams to the at least one target network client device;
a channel stacker to receive and combine the plurality of channelized signals to produce a channel stacked signal;
a digital-to-analog converter to receive the channel stacked signal and produce an analog domain channel stacked signal therefrom;
an analog-to-digital converter to receive the analog domain channel stacked signal and reproduce the channel stacked signal therefrom;
a second channel selection module to receive the reproduced channel stacked signal from the analog-to-digital converter and reproduce the plurality of channelized signals therefrom;
a multi-demodulator module coupled to the second channel selection module to receive the plurality of channelized signals as reproduced and produce the transport stream therefrom; and
an IP packetization module to convert the transport stream to packetized data for delivery of digital multimedia content via the transport stream, based upon the network client request, to the at least one target network client device via the customer premises equipment LAN as permitted by the state information, the packetized data supporting a PHY configuration of the at least one target network client device, wherein the IP packetization module includes a transcoding module configured to transcode the transport stream to support a multimedia format based upon the network client request.

18. The LAN adapter of claim 17, wherein the transcoding module is further configured to transcode, based upon the network client request, the transport stream to support the PHY configuration of the at least one target network client device.

19. The LAN adapter of claim 17, wherein the plurality of satellite IF signals include polarized low band IF signals and polarized high band IF signals.

20. The LAN adapter of claim 17, wherein a low noise block downconverter (LNB) downconverts a satellite signal to the plurality of satellite IF signals.

* * * * *